Dec. 29, 1931.  S. J. CULLEN  1,839,142
AUTOMOBILE PARKING ANCHOR
Filed Dec. 26, 1929   2 Sheets-Sheet 1
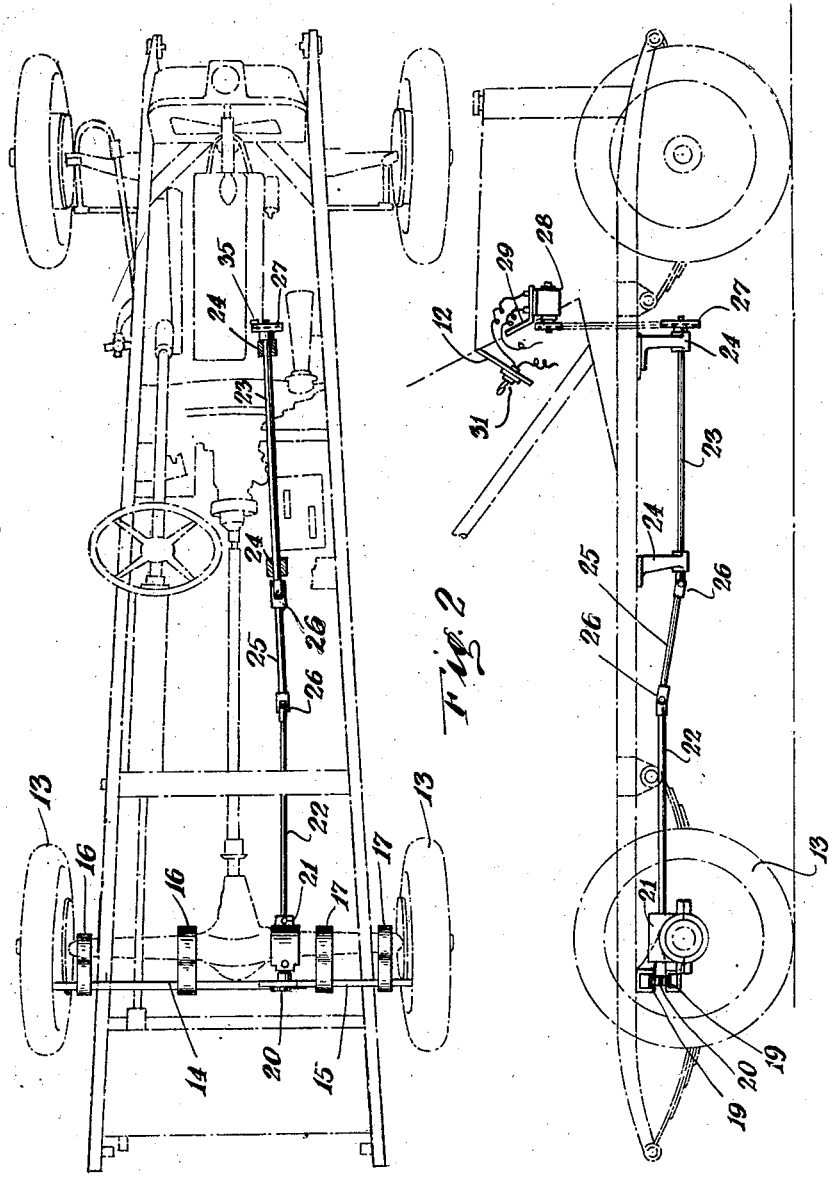
STEPHEN J. CULLEN
INVENTOR
BY Victor J. Evans
ATTORNEY Dec. 29, 1931.   S. J. CULLEN   1,839,142
AUTOMOBILE PARKING ANCHOR
Filed Dec. 26, 1929   2 Sheets-Sheet 2
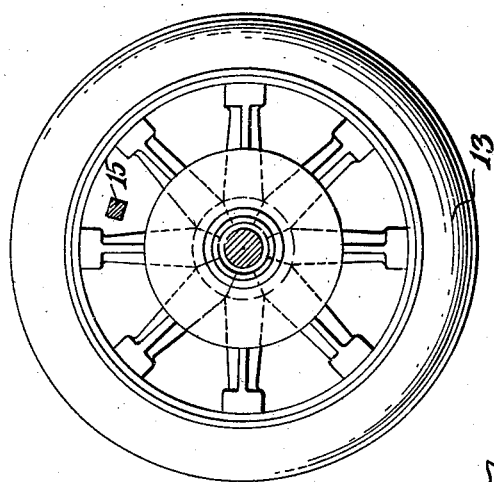
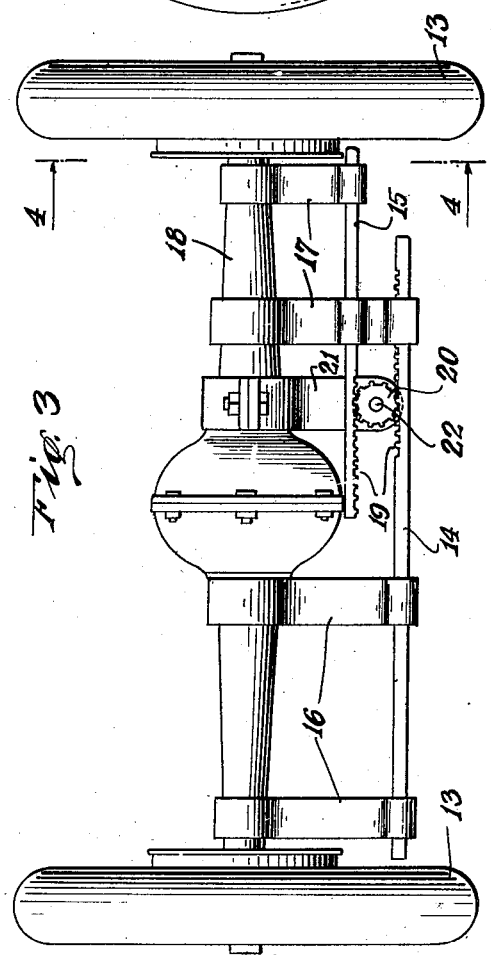
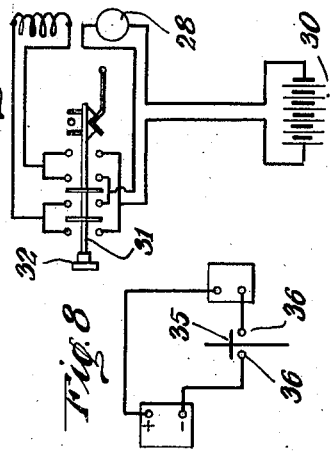
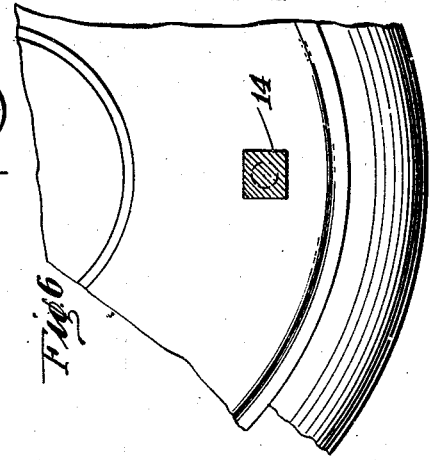
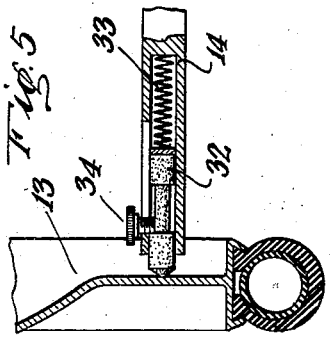
STEPHEN J. CULLEN
INVENTOR
BY *Victor J. Evans*
ATTORNEY Patented Dec. 29, 1931

1,839,142

UNITED STATES PATENT OFFICE

STEPHEN JAMES CULLEN, OF BRONX, NEW YORK

AUTOMOBILE PARKING ANCHOR

Application filed December 26, 1929. Serial No. 416,622.

This invention relates to automobile locks and has for its principal object to provide a lock operable from the driver's seat for securely locking the rear wheels as a protection against theft.

Another object is to provide a lock which may be used as a brake in extreme emergencies.

A further object is to provide means for locking the wheels of an automobile equipped with solid wheels as a protection against theft and as a protection against incomplete application of the brakes.

Yet another object is to provide a locking device including an abrasive element to engage the web of a disk wheel to cut through the web and separate the rim portion from the hub when the car is towed while locked, so that the vehicle axle will drop to the ground and thus prevent further towing of the car on its wheels.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In said drawings:

Figure 1 is a top plan view of the chassis of an automobile embodying the present invention.

Figure 2 is a side elevation of the automobile chassis illustrated in Figure 1.

Figure 3 is an inverted view of the rear axle assembly illustrating the mechanism for locking the wheels.

Figure 4 is a side view of the right rear wheel looking in the direction of the arrows in Figure 3.

Figure 5 is a view in section illustrating a modification of the construction illustrated in Figure 3 showing the mode of application to vehicle with disc type wheels.

Figure 6 is a side view of a disc wheel showing the position of the abrasive member with relation to the wheel.

Figure 7 is a diagram of connections of the motor and switch for controlling the motion of the lock.

Figure 8 is a diagram illustrating the method of interrupting the ignition circuit when the locking mechanism is rendered effective.

The numeral 11, Figures 1 and 2, represents the chassis of an automobile of well known construction while the numerals 12 and 13 represent the dash board and rear wheels respective of said vehicle. The locking mechanism consists of a pair of slidable bars or bolts 14 and 15 carried by arms 16 and 17 which in turn are supported by the rear axle housing 18. Each of the bolts 14 and 15 is provided with a rack portion 19 permanently meshing with a pinion 20 carried by horizontal shaft 22 journaled in a housing 21 mounted upon the rear axle adjacent the differential housing.

The shaft 22 is connected to a horizontal shaft 23 journaled in suitable brackets 24 carried by the frame through the medium of a short shaft 25. The shaft 23 is joined to the shafts 22, 25 through connections comprising universal joints 26, and extends to a point just beneath the dashboard 12. A sprocket wheel 27 fast on shaft 23 is connected by means of a sprocket chain to a sprocket pinion carried by a motor 28 mounted upon a support 29 back of the dash board, underneath the hood of the engine.

The motor 28 is connected when desired to a storage battery 30 for the purpose of locking or unlocking the bolts 14, 15 by means of a switch 31 mounted upon the dash board. The switch 31 is adapted to be pulled out to start the motor to lock the wheels or pushed in to start the motor to unlock the wheels.

The switch 31 is normally at the "off" position and is adapted to be locked by means of a suitable lock and key, or, if desired, it may be under the control of the ignition switch lock so that when the ignition switch is unlocked the switch 31 will also be unlocked.

The operation of the various parts described is as follows: Assume that the bolts 14, 15 are in the position indicated in Figure 3, that is, in unlocked position. The rear wheels may be locked by first unlocking the switch 31 and operating the switch knob 32 to start the motor 28 in the locking direction. The motor 28 will drive the sprocket wheel 27 in a direction which, by the turning of shafts 23, 25 and 22, and gear pinion 20, will cause the bolts 14, 15 to move into a position between the spokes of the rear wheels, the switch being kept closed long enough to allow the bolts 14, 15 to move far enough, so that their ends project between the spokes of the wheels. The operation of the key to lock the switch 31 prevents current from being sent through the motor to remove the bolts 14, 15 from the locking position. The unlocking operation is effected by unlocking the switch 31, manipulating the switch 31 to send current through the motor causing it to turn in a direction the reverse of its locking movement until the bolts 14, 15 have been retracted.

Figures 5 and 6 illustrate a modification for the purpose of adapting the above construction to an automobile equipped with disc wheels. Each of the bolts 14, 15 is somewhat shorter and is provided with an opening in which is slidably mounted a member 32 which is composed of a shouldered cylindrical piece of abrasive material such as silicon carbide. A spring 33 normally presses the member 32 outwardly, that is, to the left as shown in Figure 5. A screw 34, the end of which projects into the path of the shoulders on the member 32 permits a restricted movement of the member. When the bolts 14 or 15 are moved toward the wheels the end of the member 32 will engage the web of the wheel and the spring 33 will be compressed until the left shoulder of the member 33 strikes the screw, thus clamping the wheel firmly and preventing it from turning.

In order to render the ignition circuit of the vehicle ineffective during the time when the locking mechanism is in locked position, there is provided a bar 35 which is mounted perpendicularly to the sprocket chain driving the locking mechanism. When the locking mechanism is in normal position the bar bridges contacts 36 mounted upon the dashboard. The contacts are connected to the ignition circuit so that when a sprocket chain is driven by the motor to lock the car the cross-bar will be removed from the contacts, thus open-circuiting the ignition circuit and rendering it ineffective. This is illustrated diagrammatically in Figure 8. When the switch controlling the motor is operated to unlock the car the bar 35 will be moved backwardly until it again bridges the contacts 36 thus rendering the ignition circuit effective.

If it should happen that the car is towed by thieves when the members 32 are in engagement with the wheels owing to the operation of the switch 31 to lock the wheel webs, the turning of the wheels will cause the members 32 to rapidly wear through the web causing the rim and tire to separate from the hub or central part of the web, so that the rear end of the car will drop to the ground, with the rear axle supported upon the arms 16 and 17. Thus the car cannot be towed. The abrasive member 32 will be securely held against the wheel web by the spring 33 so that the web will be cut through after the car has been towed but a short distance.

The hereinbefore described construction admits of considerable modification without departing from the invention; therefore, it is the wish not to be limited to the precise arrangements shown and described, which are as aforesaid, by way of illustration merely. In other words the scope of protection contemplated is to be taken solely from the appended claims, interpreted as broadly as is consistent with the prior art.

What is claimed as new, is:

1. In a device of the character described, the combination with the disk wheel of a vehicle, of a locking bolt including an abrasive member and means for moving said abrasive member to locking position to engage the web portion of the wheel, whereby movement of the vehicle while locked causes said abrasive member to cut through said web.

2. In a device of the character described, the combination with disk wheels of a vehicle, of a plurality of oppositely acting locking bolts, each including at its outer end an abrasive member, means for moving said bolts to locking position with said abrasive members in engagement with the web portions of opposite wheels, each of said members including means to limit the outward and inward movement of said abrasive member, whereby movement of the vehicle while locked causes said abrasive members to cut through said webs.

3. In a device of the character described, the combination with opposite disk wheels of a vehicle, each wheel having a hub and a rim, of a plurality of oppositely acting locking bolts, each including at its outer end an abrasive member, means for moving said bolts to locking position with said abrasive members in engagement with the web portions of opposite wheels, a coiled spring constantly urging said abrasive member to its web-engaging position, each of said abrasive members having shoulders, and stop means on said locking bolt to engage said shoulders and limit the outward and inward movement of said abrasive member, whereby movement of the vehicle while locked causes said abrasive members to cut through said webs, severing the wheel rims from their hubs.

In testimony whereof I hereby affix my signature.

STEPHEN JAMES CULLEN.